United States Patent
Wynn et al.

(10) Patent No.: US 12,132,179 B2
(45) Date of Patent: Oct. 29, 2024

(54) BATTERY MODULE WITH ACTIVELY COOLED HIGH POWER ELECTRICAL INTERFACE

(71) Applicant: Rivian IP Holdings, LLC, Plymouth, MI (US)

(72) Inventors: Nathaniel C. Wynn, Tustin, CA (US); Kyle Butterfield, Rancho Santa Margarita, CA (US); Tyler Collins, Irvine, CA (US); Kyle O'Neil, Los Angeles, CA (US); Ehsan Baseri, Irvine, CA (US)

(73) Assignee: Rivian IP Holdings, LLC, Plymouth, MI (US)

( * ) Notice: Subject to any disclaimer, the term of this patent is extended or adjusted under 35 U.S.C. 154(b) by 365 days.

(21) Appl. No.: 16/680,281

(22) Filed: Nov. 11, 2019

(65) Prior Publication Data

US 2020/0152948 A1 May 14, 2020

Related U.S. Application Data

(60) Provisional application No. 62/760,435, filed on Nov. 13, 2018.

(51) Int. Cl.
  *H01M 50/507* (2021.01)
  *H01M 10/613* (2014.01)
  (Continued)

(52) U.S. Cl.
  CPC ....... *H01M 10/613* (2015.04); *H01M 10/625* (2015.04); *H01M 10/6554* (2015.04);
  (Continued)

(58) Field of Classification Search
  None
  See application file for complete search history.

(56) References Cited

U.S. PATENT DOCUMENTS

| 2011/0132580 A1* | 6/2011 | Herrmann | H01M 8/2483 165/104.33 |
| 2012/0100407 A1* | 4/2012 | Inoue | H01M 10/6554 429/94 |

(Continued)

FOREIGN PATENT DOCUMENTS

| CN | 102057532 A | 5/2011 |
| CN | 105247729 A | 1/2016 |

(Continued)

OTHER PUBLICATIONS

Shenzhen City Jia Rifeng Tai Electronic Technology Co. Ltd, Thermal conductivity of silica gel film, 2019. (Year: 2019).*

(Continued)

*Primary Examiner* — Ula C Ruddock
*Assistant Examiner* — Mary Grace Byram
(74) *Attorney, Agent, or Firm* — Haley Guiliano LLP

(57) ABSTRACT

Efficiency of a battery module is achieved using an actively cooled high power electrical interface. The battery module comprises a plurality of battery cells, at least one busbar coupled to the battery cells, a connector electrically coupled to the at least one busbar, and at least one cooling component that is thermally coupled to the first connector. The battery cells may be arranged in two layers, each layer containing a plurality of battery cells connected by a busbar. The connector comprises a contact through which the battery module may be coupled to an external circuit. The at least one cooling component provided cooling for the battery cells and the connectors and may be placed on the surface of the battery module or between layers of battery cells.

20 Claims, 4 Drawing Sheets

(51) Int. Cl.
*H01M 10/625* (2014.01)
*H01M 10/6554* (2014.01)
*H01M 10/6556* (2014.01)
*H01M 10/6567* (2014.01)
*H01M 10/6568* (2014.01)
*H01M 10/6553* (2014.01)

(52) U.S. Cl.
CPC ... *H01M 10/6556* (2015.04); *H01M 10/6567* (2015.04); *H01M 10/6568* (2015.04); *H01M 50/507* (2021.01); *H01M 10/6553* (2015.04); *H01M 2220/20* (2013.01)

(56) References Cited

U.S. PATENT DOCUMENTS

| | | | |
|---|---|---|---|
| 2012/0156543 A1* | 6/2012 | Cicero | H01M 10/0481 429/120 |
| 2012/0177970 A1 | 7/2012 | Marchio et al. | |
| 2014/0154548 A1* | 6/2014 | Dillmann | H01M 10/6552 361/534 |
| 2015/0086828 A1 | 3/2015 | Sun et al. | |
| 2016/0056514 A1* | 2/2016 | Ahn | H01M 10/6551 429/120 |
| 2017/0005305 A1* | 1/2017 | Harris | H01M 10/6569 |
| 2017/0012258 A1* | 1/2017 | Shimizu | H01M 50/543 |
| 2018/0159096 A1* | 6/2018 | Kim | H01M 10/0525 |
| 2019/0296407 A1* | 9/2019 | Newman | H01M 10/625 |

FOREIGN PATENT DOCUMENTS

| | | |
|---|---|---|
| CN | 108140793 A | 6/2018 |
| CN | 207743313 U | 8/2018 |
| EP | 2879228 A1 | 6/2015 |
| EP | 3 297 059 | 3/2018 |

OTHER PUBLICATIONS

International Search Report and Written Opinion of PCT/US2019/060781 dated Mar. 5, 2020.

* cited by examiner

BATTERY MODULE WITH ACTIVELY COOLED HIGH POWER ELECTRICAL INTERFACE

CROSS REFERENCE TO RELATED APPLICATION

This disclosure claims the benefit of U.S. Provisional Application No. 62/760,435, filed Nov. 13, 2018, which is hereby incorporated by reference in its entirety.

SUMMARY

This disclosure is directed to high power batteries, and more specifically directed to actively cooling both the batteries and an electrical interface.

A vehicle such as an electric vehicle may include battery cells to provide and/or supplement the drive power for the vehicle. The vehicle may have limited space for battery cells. The battery cells may be part of modules that include other components such as control systems and cooling for the cells, and may be densely packed within a frame. Battery cells may be electrically connected to one another via contacts which may conduct high currents, e.g., by connecting one or more batteries via wiring harnesses, busbars, etc. The selection of components within a battery module may be based on thermal considerations (e.g., based on resistance/heat generation, cooling ability, thermal mass, etc.) and/or based on electrical considerations (e.g., such as creepage and clearance).

High-power electrical connectors such as those that connect battery modules within a vehicle may typically be limited based primarily on thermal considerations. In such a system, resistance scales approximately linearly with the smallest component dimension (x, y, z, axial, or radial), while cooling ability scales with the two smallest dimensions and thermal mass scales with the three primary dimensions (x, y, and z). For a densely-packed battery system, the battery connector may reduce the overall volumetric energy density of the system (e.g., on the order of 5-10 percent), for example, as a result of the smallest dimension of the connector being insufficiently small. Stated another way, because resistance scales approximately inverse-linearly with the smallest component dimension, the smallest dimension of connectors typically needs to be made sufficiently large to prevent overheating, which in turn reduces energy density of the system. Such connectors are passively cooled by ambient air, resulting in a heat transfer coefficient of 5-50 $W/m^2K$. The connectors may also have a relatively low thermal mass for their volumes, and additional cooling may be achieved via heat sinking that occurs via connected busbars or cables.

The present disclosure overcomes the problems of conventional connectors by providing active cooling to connectors. In an exemplary embodiment of the present disclosure, the cooling capacity for electrical connectors between battery cells is increased providing an active heat sink adjacent to the connectors. A cooling component such as a cold plate having a flow of coolant may be thermally coupled to the connectors to substantially increase cooling capacity. The cooling component may be designed to interface with the connectors to increase or maximize heat exchange from the connectors to their associated cold elements, resulting in an effective heat transfer coefficient on the order of 300 $W/m^2K$. In an exemplary design, the improved electrical characteristics of the connectors due to active cooling may allow an increase in the connectors' ampacity on the order of 2.5× (e.g., based on the square root of 300 $W/m^2K$/50 $W/m^2K$). This increase in connector capacity may scale inversely with the dimension of the connector that is perpendicular to the area being cooled. In one test, it has been found that active cooling increased a connector's ampacity on the order of 2.0×. An increase in a connector's ampacity enables a smaller form factor connector to be used, thus increasing the energy density of battery systems.

In some embodiments, a battery module comprises a plurality of battery cells, at least one busbar electrically coupled to the battery cells, a first connector electrically coupled to the at least one busbar, and at least one cooling component thermally coupled to the first connector. The first connector comprises a contact configured for interfacing with a corresponding connector of an external circuit.

In some embodiments, the plurality of battery cells comprises a first battery cell layer and a second batter cell layer. The first connector is electrically coupled to the first batter cell layer via the at least one busbar and the battery module further comprises a second connector electrically coupled to the second battery cell layer. The battery cell layers may be located adjacent to each other within the battery module. In some embodiments, the at least one cooling component extends at least partially between the first battery cell layer and the second battery cell layer. The first connector may extend outward from the first battery cell layer, and the second connector may extend outward from the second battery cell layer. The at least one cooling component may similarly extend outward from the first battery cell layer and the second battery cell layer such that a surface of the at least one cooling component is adjacent to the first connector and a surface of the at least one cooling component is adjacent to the second connector.

In some embodiments, the first connector and the second connector may extend from a shared side of the battery module. In other embodiments, the first connector and second connector may extend from different sides of the battery module. For example, the first connector may be on a first side of a substantially rectangular battery module, and the second connected may be on a second side of the battery module whose face is perpendicular to that of the first side. Alternatively, the second connector may be on a side of the batter module that is opposite the first side.

In some embodiments, the at least one cooling elements comprises a cooling manifold. The cooling manifold may comprise a coolant intake and a coolant outlet, and at least one fluid passage. The cooling manifold may have substantially the same shape as the battery module. For example, in embodiments where the battery module is substantially rectangular in shape, and wherein each battery cell layer is similarly substantially rectangular in shape, the cooling manifold may also be substantially rectangular in shape so that is can be placed on a surface of between battery cell layers of the battery module.

The at least one cooling component may be physically coupled to the first connector and the second connector. Such coupling may be achieved using an electrically insulating adhesive which substantially conducts thermal energy and substantially electrically insulates the at least one cooling component from the first connector and the second connector. The insulating adhesive may have an electrical resistivity of at least $10^{10}$ Ohm-cm. The insulating adhesive may have a thermal conductivity of at least 0.5 W/mK. The at least one cooling component may comprise a single cooling component. However, in some embodiments, the at least one cooling component may comprise a first cooling component associated with the first connector and a second cooling component associated with the second connector. The physical coupling of the cooling component to the first connector may comprise a first contact surface area and the physical coupling of the cooling component to the second connector may comprise a second contact surface area. The cooling component may also comprise a third surface area that is not in physical contact with either of the first connector or the second connector. The third surface area may be greater than the first contact surface area or the second contact surface area. The third surface area may even be greater than the combined surface area of the first contact surface and the second contact surface. For example, the third surface area may be at least two times greater than the combined surface area of the first contact surface and the second contact surface.

In some embodiments, connectors of a battery module may be cooled by connecting, via a first connector of the battery module and at least one busbar, an external electrical circuit to a first battery cell layer of the battery module, and connecting, via a second connector of the battery module and the at least one busbar, the external electrical circuit to a second battery cell layer of the battery module, wherein the first battery cell layer and the second battery cell layer are electrically coupled within the battery module. At a coolant intake of the battery module, a flow of coolant to a cooling plate of the battery module is then provided, wherein the cooling plate extends substantially between the first battery cell layer and the second battery cell layer, and wherein the cooling plate includes a first cooling extension thermally and physically coupled to the first connector and a second cooling extension thermally and physically coupled to the second connector. The flow of coolant from the cooling plate is then received at a coolant outlet of the battery module.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
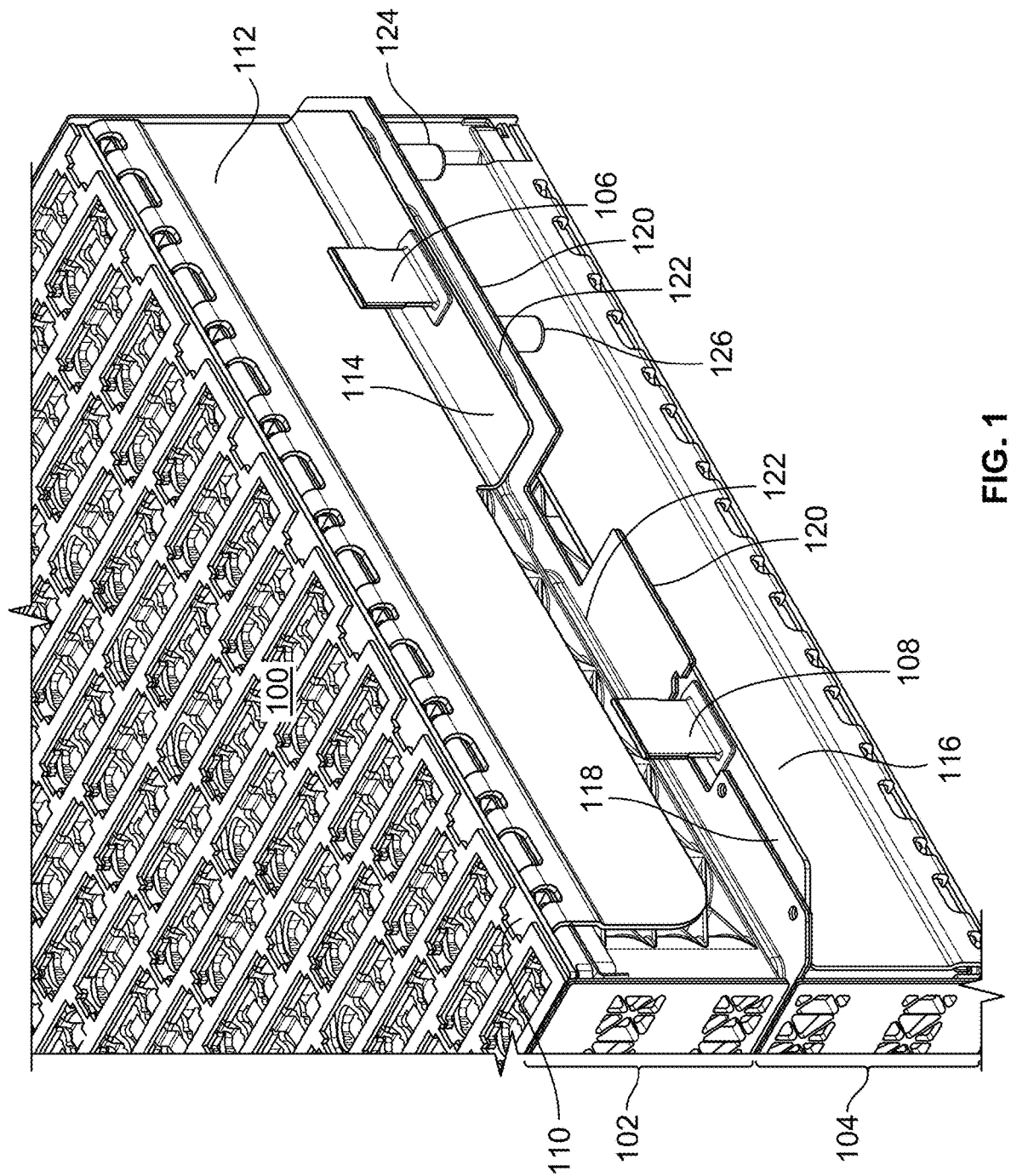
FIG. 1 depicts an exemplary battery module in accordance with some embodiments of the present disclosure.

FIG. 1 depicts an exemplary battery module 100 in accordance with an embodiment of the present disclosure. The battery module may include multiple battery cells arranged, for example, in a rectangular shape and vertically stacked in two layers (e.g., layers 102, 104), although other configurations may be utilized (e.g., any suitable number of battery cells, battery cell shapes, relative locations of battery cells, layers, etc. may be utilized). High power contacts 106, 108 may allow the battery cells of battery module 100 to be connected to an external circuit. For example, the battery cells of battery module 100 may be electrically connected, via high power contacts 106, 108, to other battery modules or to a load (e.g., to provide electrical power to an electrical motor and other components of an electrical vehicle). As depicted in FIG. 1, a first layer 102 of battery cells may be coupled internally (e.g., in a parallel configuration or series configuration) via busbar 110. Busbar 110 is physically and/or electrically connected to terminal busbar 112 which extends along a side of layer 102. An electrical connector 114, which physically and/or electrically interfaces with terminal busbar 112, may extend from battery module 100 horizontally and may include vertically oriented high power contact 106 for electrical coupling to the external circuit, e.g., by a cable and/or busbar. Similarly, a second layer 104 of battery cells may be coupled internally via another busbar (not shown) which is physically and/or electrically connected to terminal busbar 116, which extends along a side of layer 104. An electrical connector 118, which physically and/or electrically interfaces with terminal busbar 116, may extend from battery module 100 horizontally and may include vertically oriented high power contact 108 for electrical coupling to the external circuit.

The battery module may also include a cooling component to provide cooling to the battery cells and other components that experience heating during operation such as the connectors. Although a variety of cooling components may be utilized, in an exemplary embodiment the cooling component may be a cooling manifold 120 having a rectangular plate shape (e.g., a cooling plate). A coolant may be circulated through channels 122 of the cooling manifold to increase the heat transfer, and in an exemplary embodiment may be provided via a coolant intake 124 and may exit the cooling manifold via a coolant outlet 126. The rectangular plate shape may generally match the rectangular shape of the battery cell arrangement and may be located in between two layers 102, 104 of battery cells, although cooling may be provided to additional surfaces of the battery cells in other embodiments. In some embodiments, the cooling manifold 120 may also extend outside of the battery module to cover a portion of the connector structure that is not used to make the electrical contact, thereby providing cooling of the connectors as well as the battery packs. For example, cooling manifold 120 may cover at least a portion of the horizontally-extending portion of connectors 114, 118, leaving the vertically-extending contacts 106, 108 exposed for electrical contact with the external circuit. A bonding material such as an electrically insulating adhesive (e.g., a thermal interface material) may attach cooling manifold 120 to connectors 114, 118, such that thermal energy may be transferred from connectors 114, 118 to cooling manifold 120 while connectors 114, 118 remain electrically insulated from cooling manifold 120. For example, the electrically insulating adhesive may have an electrical resistivity of at least $10^{10}$ Ohm-cm (e.g., approximately $10^{10}$ Ohm-cm to approximately $10^{12}$ Ohm-cm) and a thermal conductivity of at least 0.5 W/mK (e.g., 0.5 W/mK, 0.89 W/mK, 3.4 W/mK, or a suitable range such as 0.89 W/mK to 3.4 W/mK).

As shown in FIG. 1, cooling plate 120 extends out from the side of battery module 100 and at least partially covers the top of the horizontally extending portion of connector 118 and the bottom of the horizontally extending portion of connector 114. Partially visible are cooling channels 122 of cooling plate 120. As illustrated, cooling channels 122 do not extend along the portion of the cooling plate that covers the horizontally extending portion of connector 118, but they do at least partially extend along the portion of the cooling plate that covers the horizontally extending portion of connector 118. It will be understood that in some embodiments, cooling channels 122 may extend at least partially or fully over the portion of cooling plate 120 that covers connector 114, the portion of cooling plate 120 that covers connector 118, or both.

It will be understood that in some embodiments, the cooling component of the present disclosure provides cooling to connector components and associated hardware external to the battery modules and is not limited to the cooling plate shown in FIG. 1. In some embodiments, the cooling component does not provide cooling to the inside of the battery module. Additionally, while FIG. 1 shows connectors 114 and 118 located on the same side of battery module 100, it will be understood that connectors 114 and 118 may be located on different sides of battery module 100. For example, connector 114 may be located on a first side of battery module 100 and connector 118 may be located on a side of battery module 100 whose face is perpendicular to that of the side on which connector 114 is located. Alternatively, connector 118 may be located on a side of battery module 100 that is opposite the side on which connector 114 is located.

Figure 2:
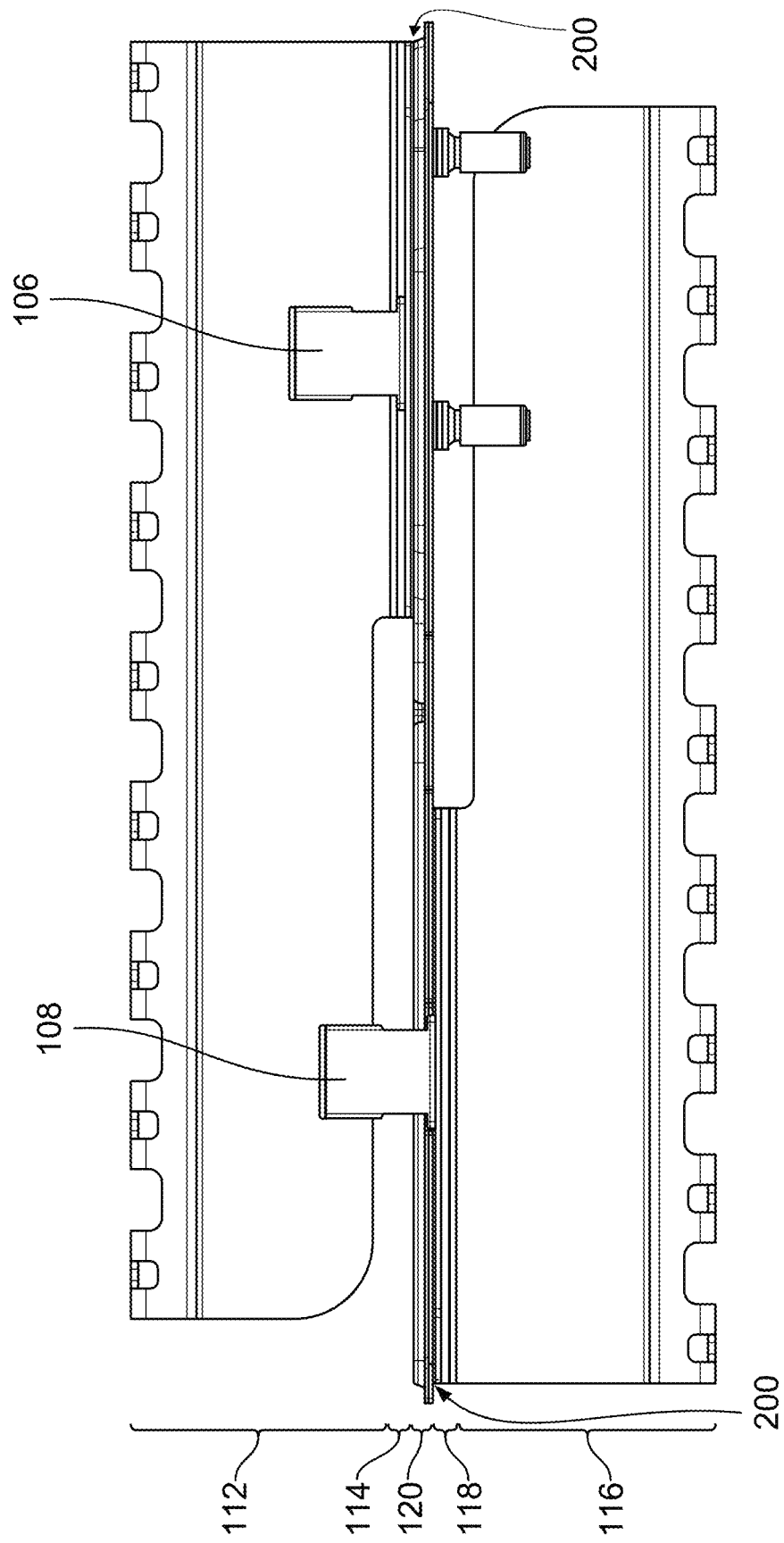
FIG. 2 depicts an exemplary partial side view of a battery module in accordance with some embodiments of the present disclosure.

FIG. 2 depicts an exemplary partial side view of battery module 100 described above in connection with FIG. 1. In an exemplary embodiment, upper terminal busbar 112 is associated with a first battery cell and lower terminal busbar 116 is associated with a second battery cell. Upper connector 114 is electrically coupled to upper terminal busbar 112, extends horizontally from upper terminal busbar 112, and includes vertically extending high power contact 106. Lower connector 118 is electrically coupled to lower terminal busbar 116, extends horizontally from lower terminal busbar 116, and includes a vertically extending high power contact 108. Cooling plate 120 is located between upper connector 114 and lower connector 118 and is thermally coupled to the horizontally extending portions of each of connectors 114, 118 via a respective layer of thermal interface material 200. In this manner, cooling plate 120 may provide heat transfer from upper connector 114 and lower connector 118, increasing the efficiency of the battery module.

Figure 3:
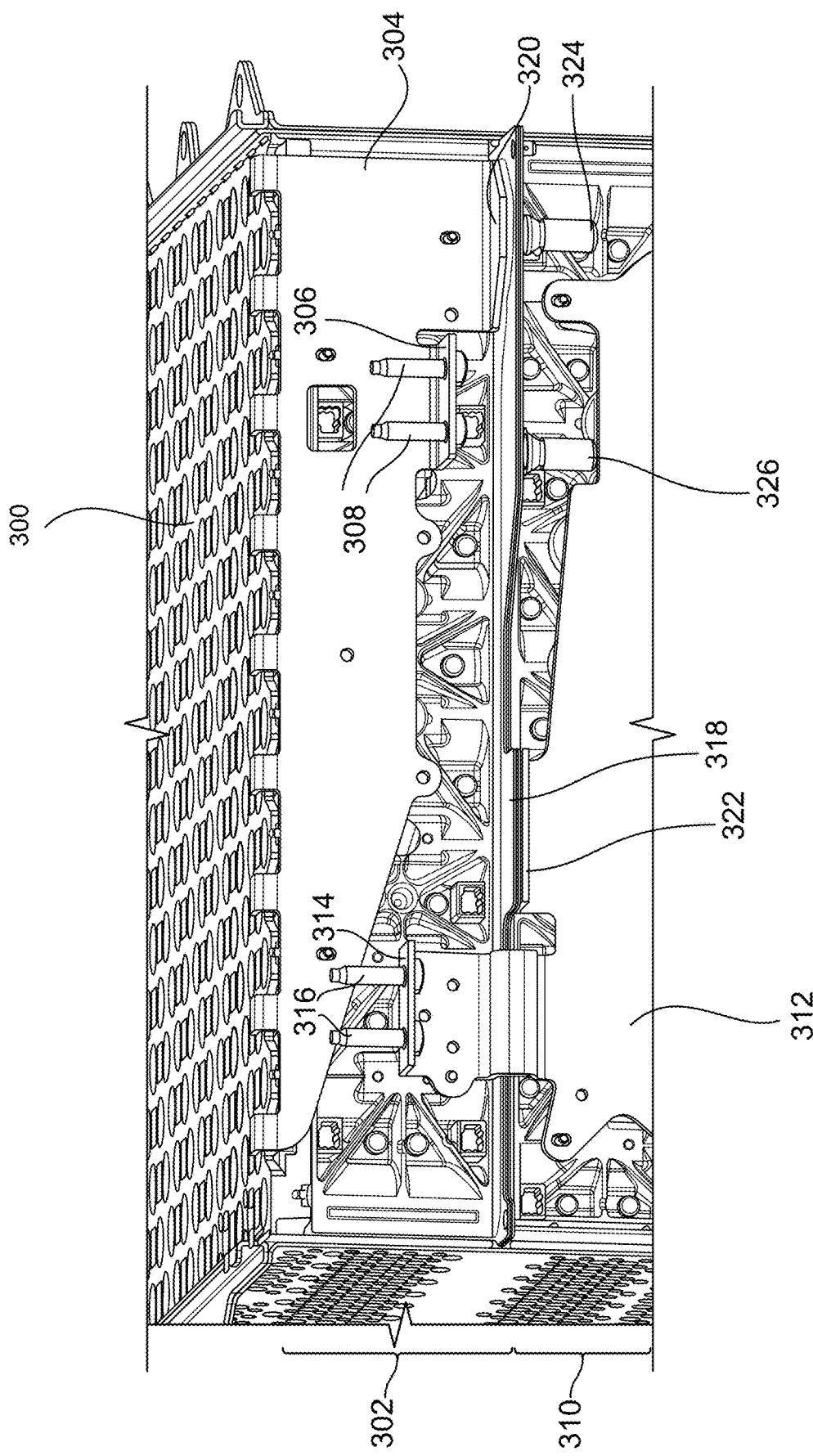
FIG. 3 depicts a second exemplary battery module in accordance with some embodiments of the disclosure.

FIG. 3 depicts a second exemplary battery module 300 in accordance with some embodiments on the disclosure. Battery cells of a first layer 302 of battery module 300 are electrically coupled, via a busbar (not shown) to terminal busbar 304. Similar to terminal busbar 112, terminal busbar 304 extends along a side of layer 302 and physically and/or electrically interfaces with electrical connector 306. Electrical connector 306 may extend horizontally from battery module 300 and may include vertically oriented bolts 308 to serve as contacts through which battery module 300 may be electrically coupled to an external circuit. Bolts 308 may be composed of any electrically conductive material, including copper, aluminum, silver, gold, steel, or any combination thereof, or any other suitable material. Battery cells of a second layer 310 may similarly be electrically coupled, via a busbar (not shown) to terminal busbar 312. Terminal busbar 312 extends along a side of layer 310 and physically and/or electrically interfaces with electrical connector 314. Electrical connector 314 may extend horizontally from battery module 300 and may include vertically oriented bolts 316 to serve as contacts through which battery module 300 may be electrically coupled to an external circuit. Bolts 316 may be composed of any of the materials listed above in connection with bolts 308. Bolts 316 may be composed of a different material than bolts 308.

Cooling plate 318 may be similar to cooling plate 120, and is located between the two layers 302, 310 of battery cells. A portion 320 of terminal busbar 304 may extend horizontally from battery module 300. Similarly, a portion 322 of terminal busbar 312 may extend horizontally from battery module 300. A bonding material such as an electrically insulating adhesive (e.g., a thermal interface material) may attach cooling plate 318 to portions 320, 322, such that thermal energy may be transferred from portions 320, 322 to cooling plate 318 while portions 320, 322 remain electrically insulated from cooling plate 318. A coolant may be circulated through channels of cooling plate 318 (not shown) to increase the heat transfer, and in an exemplary embodiment may be provided via a coolant intake 324 and may exit the cooling plate via a coolant outlet 326.

Figure 4:
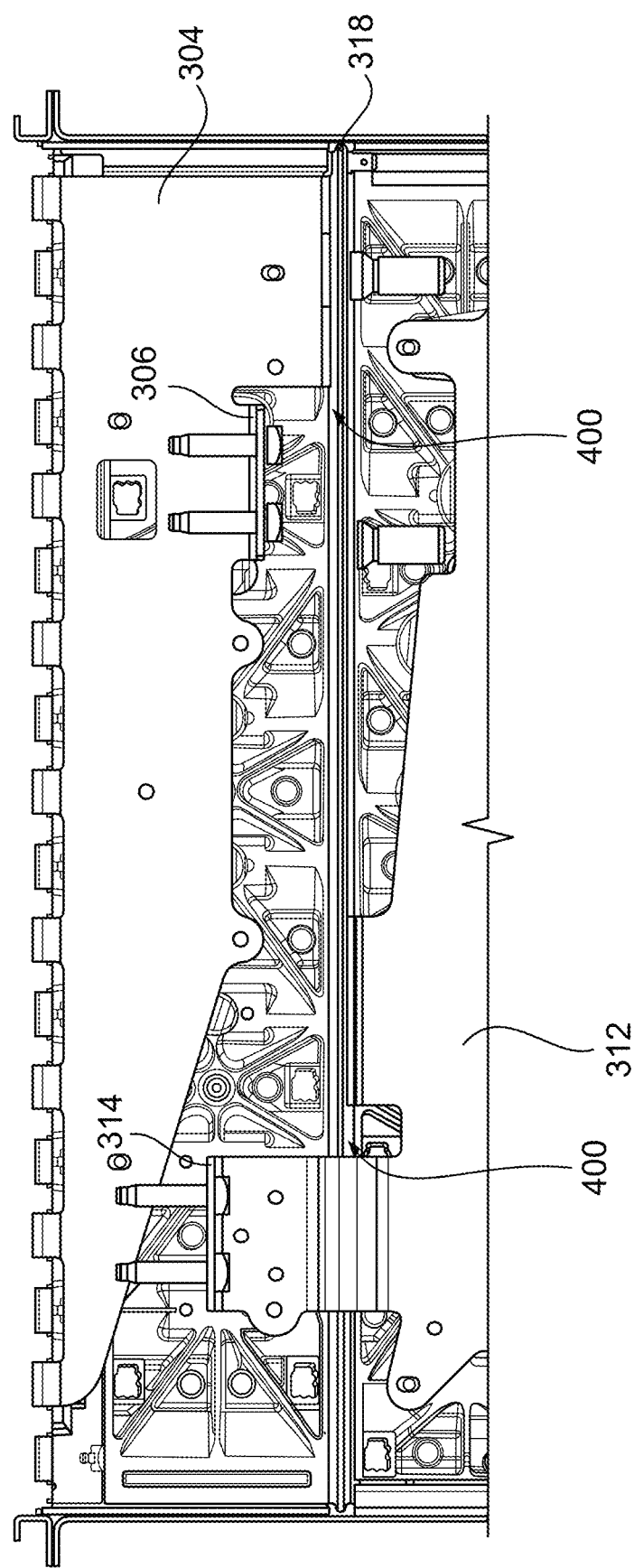
FIG. 4 depicts a second exemplary partial side view of a battery module in accordance with some embodiments of the disclosure.

FIG. 4 depicts a second exemplary partial side view of battery module 300 in accordance with some embodiments of the disclosure. In an exemplary embodiment, upper terminal busbar 304 is associated with a first battery cell and lower terminal busbar 312 is associated with a second battery cell. Upper connector 306 is electrically coupled to upper terminal busbar 304, extends horizontally from upper terminal busbar 304, and includes vertically extending bolts 308 to serve as high power electrical contacts. Lower connector 314 is electrically coupled to lower terminal busbar 312, extends horizontally from lower terminal busbar 312, and includes vertically extending bolts 316 to serve as high power electrical contacts. Cooling plate 318 is located between upper terminal busbar 304 and lower terminal busbar 312 and is thermally coupled to the horizontally extending portions of each of upper terminal busbar 304 and lower terminal busbar 312 via a respective layer of thermal interface material 400. In this manner, cooling plate 318 may provide heat transfer from upper terminal busbar 304 and lower terminal busbar 312, increasing the efficiency of the battery module.

The foregoing description, for purposes of explanation, used specific nomenclature to provide a thorough understanding of the disclosure. However, it will be apparent to one skilled in the art that the specific details are not required to practice the methods and systems of the disclosure. Thus, the foregoing descriptions of specific embodiments of the present disclosure are presented for purposes of illustration and description. They are not intended to be exhaustive or to limit the disclosure to the precise forms disclosed. Many modifications and variations are possible in view of the above teachings. For example, the size, shape, and configuration of the cooling component may take many different forms in accordance with the present disclosure. It will be understood that while the cooling plate of FIG. 1 provides cooling to both the battery cells and the connectors, in some embodiments a separate cooling component can be used to provide cooling to the connectors. In addition, in some embodiments an additional cooling component or channel can be provided to provide cooling to the other side of the connecter (not shown in the FIG. 1). The embodiments described above were chosen and described in order to best explain the principles of the disclosure and its practical applications, to thereby enable others skilled in the art to best utilize the methods and systems of the disclosure and various embodiments with various modifications as are suited to the particular use contemplated. Additionally, different features of the various embodiments, disclosed or otherwise, can be mixed and matched or otherwise combined so as to create further embodiments contemplated by the disclosure.

What is claimed is:
1. A battery, comprising:
   a first busbar electrically coupled to a first battery cell layer;

a second busbar electrically coupled to a second battery cell layer, wherein the first battery cell layer and the second battery cell layer are on opposite sides of a cooling component;

a first connector electrically coupled to the first battery cell layer via the first busbar; and a second connector electrically coupled to the second battery cell layer via the second busbar, wherein the first connector, the second connector, and the cooling component extend outward from a shared side of the first and second battery cell layers, and wherein the cooling component is directly bonded to the first connector and the second connector via an electrically insulative adhesive.

2. The battery of claim 1, wherein:

the first connector comprises a first contact configured for interfacing with a corresponding first connector of an external circuit;

the second connector comprises a second contact configured for interfacing with a corresponding second connector of the external circuit; and each of the first contact and the second contact comprises a bolted electrical joint.

3. The battery of claim 1, wherein the first battery cell layer and the second battery cell layer are located adjacent to each other within the battery.

4. The battery of claim 1, wherein the cooling component extends outward from the first battery cell layer and the second battery cell layer adjacent to the first connector and adjacent to the second connector.

5. The battery of claim 4, wherein the cooling component comprises a cooling manifold.

6. The battery of claim 5, wherein the cooling manifold comprises a coolant intake and a coolant outlet, and wherein the cooling manifold comprises at least one fluid passage.

7. The battery of claim 5, wherein each of the battery cell layers and the cooling manifold have a rectangular shape.

8. The battery of claim 1, wherein the electrically insulating adhesive conducts thermal energy and electrically insulates the cooling component from the first connector and the second connector.

9. The battery of claim 8, wherein the electrically insulating adhesive has an electrical resistivity of at least $10^{10}$ Ohm-cm.

10. The battery of claim 8, wherein the electrically insulating adhesive of a thermal conductivity of at least 0.5 W/mK.

11. The battery of claim 1, wherein the cooling component comprises a single cooling component.

12. The battery of claim 1, wherein the cooling component comprises a first cooling component associated with the first connector and a second cooling component associated with the second connector.

13. The battery of claim 1, wherein the bonding of the cooling component to the first connector comprises a first contact surface area, wherein the bonding of the cooling component to the second connector comprises a second contact surface area, and wherein the cooling component comprises a third surface area that is not in physical contact with either of the first connector or the second connector.

14. The battery of claim 13, wherein the third surface area is greater than either the first contact surface area or the second contact surface area.

15. The battery of claim 13, wherein the third surface area is greater than the first contact surface area plus the second contact surface area.

16. The battery of claim 13, wherein the third surface area is at least two times greater than the first contact surface area plus the second contact surface area.

17. A method comprising:

connecting, via a first connector of a battery and a first busbar, an external electrical circuit to a first battery cell layer of the battery;

connecting, via a second connector of the battery and a second busbar, the external electrical circuit to a second battery cell layer of the battery, wherein the first battery cell layer and the second battery cell layer are electrically coupled within the battery;

providing, at a coolant intake of the battery, a flow of coolant to a cooling plate of the battery, wherein the first battery cell layer and the second battery cell layer are on opposite sides of the cooling plate, wherein the cooling plate includes a first cooling extension directly bonded to the first connector by an electrically insulative adhesive and a second cooling extension directly bonded to the second connector by the electrically insulative adhesive, and wherein the first connector, the second connector, the first cooling extension, and the second cooling extension extend outward from a shared side of the first and second battery cell layers; and receiving, at a coolant outlet of the battery, the flow of coolant from the cooling plate.

18. The battery of claim 2, wherein the first and second battery cell layers have a rectangular shape and are vertically stacked, and wherein the first connector, the second connector, and the cooling component extend horizontally from the shared side of the first and second battery cell layers.

19. The battery of claim 18, wherein the first contact and the second contact extend in a first direction.

20. The battery of claim 19, the cooling component comprises a coolant intake and a coolant outlet, wherein the coolant intake and the coolant outlet extend in a second direction opposite the first direction.

* * * * *